United States Patent
Povey et al.

(12)

(10) Patent No.: US 10,823,295 B2
(45) Date of Patent: Nov. 3, 2020

(54) DEVICE FOR CONTROLLING FLUID FLOW

(71) Applicant: OXFORD FLOW LIMITED, Oxford (GB)

(72) Inventors: Thomas Povey, Oxford (GB); Matthew Collins, Oxford (GB)

(73) Assignee: OXFORD FLOW LIMITED, Oxford (GB)

( * ) Notice: Subject to any disclaimer, the term of this patent is extended or adjusted under 35 U.S.C. 154(b) by 0 days.

(21) Appl. No.: 16/096,629

(22) PCT Filed: Apr. 25, 2017

(86) PCT No.: PCT/GB2017/051150
§ 371 (c)(1),
(2) Date: Oct. 25, 2018

(87) PCT Pub. No.: WO2017/187158
PCT Pub. Date: Nov. 2, 2017

(65) Prior Publication Data
US 2019/0136984 A1    May 9, 2019

(30) Foreign Application Priority Data
Apr. 26, 2016  (GB) .................................. 1607237.3

(51) Int. Cl.
| F16K 47/08 | (2006.01) |
| F16K 3/24 | (2006.01) |
| F16K 31/122 | (2006.01) |

(52) U.S. Cl.
CPC .............. *F16K 3/243* (2013.01); *F16K 3/246* (2013.01); *F16K 31/122* (2013.01);
(Continued)

(58) Field of Classification Search
CPC ..... Y10T 137/86734; Y10T 137/86759; Y10T 137/896791; F16K 47/08
(Continued)

(56) References Cited

U.S. PATENT DOCUMENTS

| 3,836,116 A | * | 9/1974 | Noiles | F16K 31/383 |
| | | | | 251/174 |
| 4,244,388 A | * | 1/1981 | Feiss | F16K 17/048 |
| | | | | 137/115.16 |

(Continued)

FOREIGN PATENT DOCUMENTS

| CN | 202746750 U | 2/2013 |
| DE | 19835713 A1 | 2/2000 |

(Continued)

OTHER PUBLICATIONS

Author Unknown, "Mooney FlowMax Low Flow Range Extender (LFRX)," Product Data Sheet, GE Oil & Gas, 2012, General Electric Company, 2 pages.

(Continued)

*Primary Examiner* — Robert K Arundale
(74) *Attorney, Agent, or Firm* — Withrow & Terranova, P.L.L.C.; Vincent K. Gustafson

(57) ABSTRACT

A device (1) for controlling the flow of a fluid through a conduit (3) from an upstream side (8) to a downstream side (10). The device includes a housing (4) having one or more valve apertures (6) through which the flow of fluid is selectively controlled. A valve member (12) is mounted on the housing and arranged to move reciprocally to selectively open and close the one or more valve apertures. A seal (20) is arranged at or beyond a position the valve member reaches when the one or more valve apertures are all closed. The device also includes a resilient member (26) that acts to bias the seal towards the valve member.

15 Claims, 2 Drawing Sheets

Figure 1:
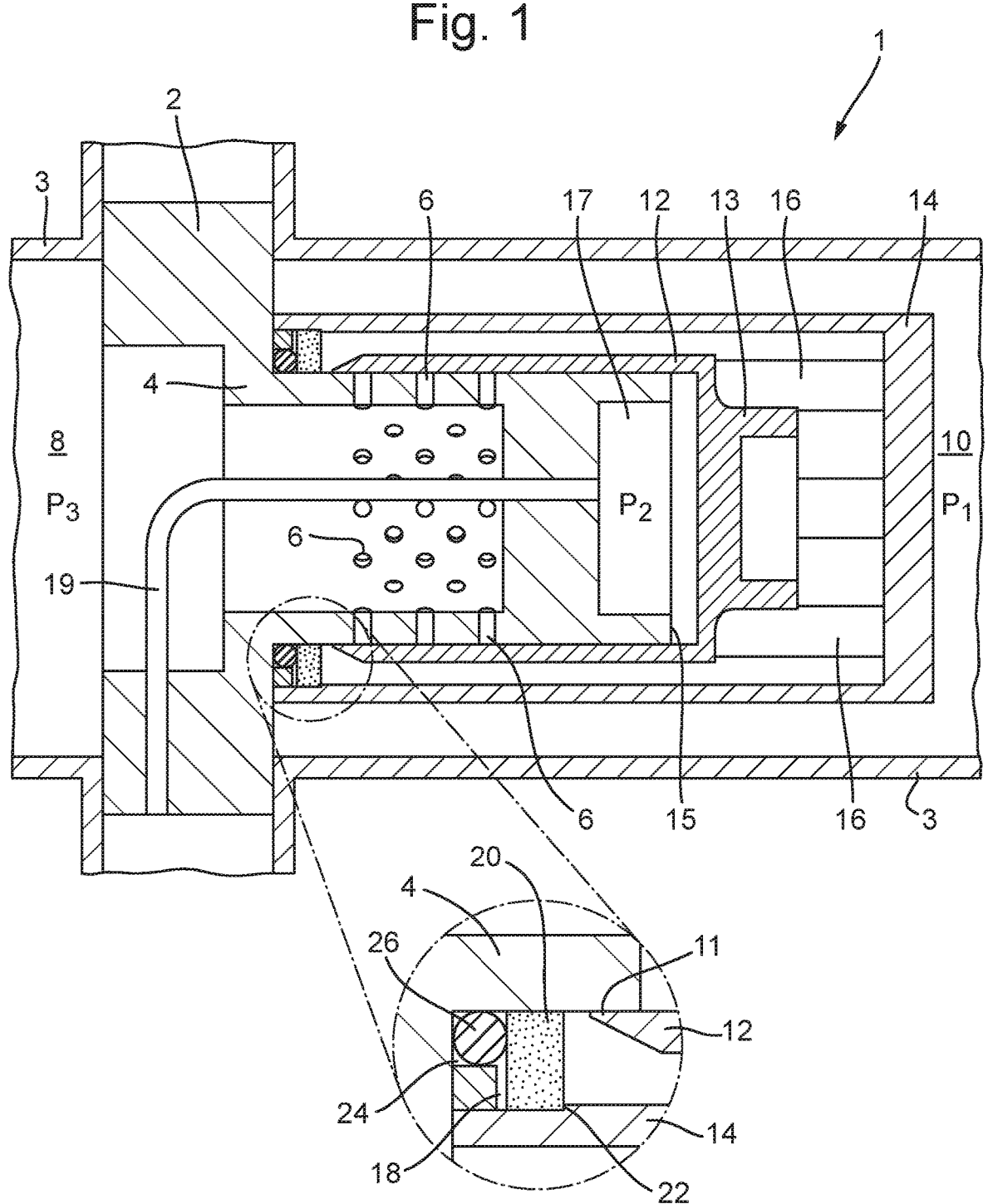

(52) U.S. Cl.
CPC ...... *F16K 31/1223* (2013.01); *F16K 31/1228* (2013.01); *F16K 47/08* (2013.01); *Y10T 137/86759* (2015.04)

(58) Field of Classification Search
USPC .......................................................... 251/174
See application file for complete search history.

(56) References Cited

U.S. PATENT DOCUMENTS

| | | | |
|---|---|---|---|
| 4,471,810 A | 9/1984 | Muchow et al. | |
| 4,815,699 A * | 3/1989 | Mueller | F16K 41/10 251/129.11 |
| 8,752,807 B2 * | 6/2014 | Nomichi | F16K 1/42 251/174 |
| 9,458,941 B2 * | 10/2016 | Bohaychuk | F16K 3/246 |
| 2005/0115619 A1 * | 6/2005 | Kawulka | E21B 33/0355 137/625.33 |
| 2006/0207666 A1 | 9/2006 | Micheel et al. | |
| 2007/0017586 A1 | 1/2007 | Bohaychuk | |
| 2010/0200791 A1 | 8/2010 | Yung et al. | |
| 2011/0180167 A1 * | 7/2011 | Bohaychuk | F16K 3/24 137/625.3 |
| 2015/0108378 A1 | 4/2015 | Lovell | |
| 2017/0051845 A1 * | 2/2017 | Bohaychuk | F16K 47/08 |

FOREIGN PATENT DOCUMENTS

| | | | |
|---|---|---|---|
| WO | 2013068747 A1 | 5/2013 | |
| WO | 2015021627 A1 | 2/2015 | |

OTHER PUBLICATIONS

International Search Report and Written Opinion for PCT/GB2017/051150, dated Jul. 14, 2017, 13 pages.
International Preliminary Report on Patentability for PCT/GB2017/051150, dated Nov. 8, 2018, 8 pages.
Search Report for United Kingdom Patent Application No. GB1607237.3, dated Nov. 22, 2016, 3 pages.
First Office Action and Search Report for Chinese Patent Application No. 201780025889.0 dated Jul. 31, 2020, 13 pages including English translation.

* cited by examiner

DEVICE FOR CONTROLLING FLUID FLOW

This application is a 35 U.S.C. § 371 national phase filing of International Application No. PCT/GB2017/051150 filed on Apr. 25, 2017, and claims the benefit of United Kingdom Patent Application No. 1607237.3 filed on Apr. 26, 2016, wherein the disclosures of the foregoing applications are hereby incorporated by reference herein in their respective entireties.

This invention relates to a device for controlling the flow of fluid therethrough, in particular to a device including a shut-off seal.

In fluid flow systems such as pipes and conduits, e.g. as can be found in many different industrial situations, there is a need to regulate the pressure in a fluid flow stream. In such systems there is an input pressure that may be constant or fluctuating in time and which it is desired to control to a lower target output pressure, which also can be constant or fluctuating.

One example of such devices is a pressure regulator as disclosed in the Applicant's previous application WO 2013/068747 A1 which is arranged to control the downstream pressure in a conduit. The flow through the pressure regulator is selectively controlled by a valve member that opens and closes a plurality of valve apertures dependent upon the difference between the pressure in the downstream side of the conduit and a control pressure that is arranged to act on the valve member.

In such designs it is important to minimise the leakage of fluid through the valve apertures when the valve apertures are fully closed by the valve member, i.e. at "shut-off".

It is an object of the invention to provide a device for controlling the flow of a fluid through a conduit with an improved shut-off.

When viewed from a first aspect the invention provides a device for controlling the flow of a fluid through a conduit from an upstream side of the device to a downstream side of the device, the device comprising:

a housing having defined therein one or more valve apertures through which the flow of fluid is selectively controlled;

a valve member mounted on the housing and arranged to move reciprocally to selectively open and close the one or more valve apertures, thereby controlling flow of the fluid through the one or more valve apertures;

a seal arranged at or beyond a position the valve member reaches when the one or more valve apertures are all closed; and a resilient member that acts to bias the seal towards the valve member;

wherein the valve member is arranged to come into contact with the seal when the valve member reaches or passes the position at which the one or more valve apertures are all closed such that the valve member acts on the seal against the bias of the resilient member and the seal acts to provides a barrier to the flow of fluid between the upstream and downstream sides of the device.

The present invention provides a device for controlling (e.g. pressure regulating) the flow of fluid through a conduit (e.g. in which the device is placed). The flow of fluid through the device is selectively controlled between an upstream side of the device and a downstream side of the device, with one or more valve apertures of the device, for example, defining the boundary between the upstream and downstream sides. The one or more valve apertures are defined in a housing of the device, with the flow of fluid through the one or more valve apertures, and thus through the device from the upstream side to the downstream side, being controlled by a valve member that is movably mounted on the housing. The valve member is arranged to move reciprocally on the housing to selectively open and close the one or more valve apertures.

A seal is positioned in the device at or beyond a point that the valve member travels to once it has closed all of the one or more valve apertures. The seal is biased towards the valve member by a resilient member. The valve member and the seal are arranged such that when the valve member reaches or exceeds the point at which it has closed all of the one or more valve apertures, the valve member comes into, e.g. sealing, contact with the seal. When the valve member contacts the seal, the valve member acts against the bias of the resilient member which results in a barrier to the fluid being provided between the upstream and downstream sides of the device.

Thus it will be appreciated that the fluid flow control device (e.g. pressure regulator or control device) of the present invention has a seal that provides a barrier between the upstream and downstream sides of the device when the valve member closes all of the one or more valve apertures, thus helping to provide effective shut-off for the device. Furthermore, the seal is biased, e.g. sprung, by the resilient member which helps to reduce the wear of the seal by the valve member, owing to the compliance of the seal provided by the biasing of the resilient member. For example, when the valve member comes into contact with the seal and acts against the bias of the resilient member, this may result in the seal being moved slightly such that the force on the seal by the valve member is reduced.

This reduced force helps to reduce the wear on the seal by the valve member, because it will be appreciated that otherwise, it would be the seal (as opposed to the resilient member) that is deformed by the action of the valve member on it. Thus, as will be seen in the preferred embodiments, the material chosen for the seal may be chosen for its durability against wear by the valve member, e.g. its anti-wear properties, and the resilient member may be chosen for its biasing properties. Furthermore, even when the seal eventually does become worn, the compliance provided by the biasing of the resilient member may help to still provide an effective seal, when the valve member is closed, for fluid between the upstream and downstream sides of the device.

The housing, in which the one or more valve apertures are defined, may have any suitable and desired configuration. In a preferred embodiment the housing comprises a (e.g. hollow) cylinder, e.g. with the one or more valve apertures defined in (e.g. extending radially through) the wall of the cylinder.

Thus preferably the valve member comprises a cylindrical body mounted on the, e.g. outside of the, housing. In one particularly preferred embodiment the housing comprises a cylinder (in which the one or more valve apertures are defined) and a cylindrical valve member is mounted coaxially on the outside of the housing and arranged to move reciprocally in a direction in which the cylindrical housing and valve member are cylindrically extended (i.e. parallel to the main axis of the cylinders).

Thus preferably the part of the valve member that comes into contact with the seal is the end of the cylinder, e.g. preferably the valve member comprises a circular rim arranged to come into contact with the seal when the valve member reaches or passes the position at which the one or more valve apertures are all closed.

The device (preferably via the housing) may be mounted in the conduit in any suitable and desired way, e.g. integrally formed with (e.g. a section of) the conduit. However preferably the device is provided as a separate structure within the conduit and thus in a preferred embodiment the device comprises a flange for mounting the device within the conduit (e.g. for attaching the device to the conduit), wherein the housing is attached to, e.g. integrally formed with, the flange. Preferably the flange is radially extending, e.g. in a plane perpendicular to the main cylindrical axis of the housing.

Preferably the flange is arranged for mounting the device in the conduit, e.g. for suspending the device within the conduit, preferably so that the device (and thus the housing and the valve member) is arranged to be mounted coaxially within the conduit. The housing may be arranged with respect to the flange in any suitable and desired configuration. Preferably the housing projects (in the direction of its main cylindrical axis) perpendicularly to the plane of the flange. The housing may project from the flange in an upstream direction or in downstream and upstream directions (i.e. the housing may extend through the flange in both of these directions) but preferably the housing projects from the flange in a downstream direction (e.g. preferably the flange forms the upstream extent of the device).

In a preferred embodiment the flange, together with the housing in which the one or more apertures are defined, defines the boundary between the upstream and downstream sides of the device. Thus preferably, when the valve member closes, all of the one or more valve apertures, the flange, the housing and the valve member act to form a barrier between the upstream and downstream sides of the conduit in order to prevent the flow of fluid through the device.

The valve member may be mounted on the housing (in order to selectively open and close the one or more valve apertures owing to the reciprocal motion of the valve member) in any suitable and desired way, e.g. in the cylindrical arrangement outlined above.

In a preferred embodiment the device comprises a control volume defined between the housing and the valve member, and an arrangement (e.g. a pilot pressure regulator) for introducing a control pressure into the control volume. The control pressure may thus be controlled by the arrangement to control the operating characteristics of the device.

In a preferred embodiment the valve member comprises a stop arranged to engage with the housing to limit the travel of the valve member substantially past the point at which the valve member comes into contact with the seal (e.g. preferably the valve member is able to move (e.g. a relatively small distance) against the bias of the resilient member after its initial contact with the seal before the stop of the valve member engages with the housing).

The stop (and any corresponding feature of the valve member with which it engages) may be provided in any suitable and desired way. In a preferred embodiment the valve member comprises a planar end (e.g. at the opposite end from the end that comes into contact with the seal) that engages with an end of the housing. When the housing and valve member each comprise a cylinder, preferably the valve member comprises a circular end which engages with a circular end of the housing, e.g. the valve member may be thought of as a cap on the housing.

Preferably the engagement of the end of the valve member with the end of the housing (i.e. the contact between these two components) is a hard contact, e.g. it is not resilient or compliant. This contrasts with the contact made between the valve member and the seal which, owing to the biasing of the resilient member, is compliant. In some operating conditions of the fluid flow control device, the valve member may close with a large force (e.g. several tens of kilonewtons in some embodiments) and the hard contact between the end of the valve member and the end of the housing is able to withstand this.

The housing and/or valve member could be made from any suitable and desired materials. However, owing to the reasons outlined above, preferably the housing and/or the valve member are rigid. Thus the housing and/or valve member could be made from a plastic but preferably the housing and/or the valve member comprise a metal.

Thus, in a particularly preferred embodiment, the end of the (e.g. metal) cylindrical valve member engages with the end of the (e.g. metal) cylindrical housing with a large axial load and thus at the other end of the valve member the, e.g. circular rim, comes into contact with the seal with a comparatively much reduced force, e.g. at shut-off, owing to the end of the cylindrical housing taking the majority of the, e.g. axial, load with the (e.g. closed) end of the valve member. Thus preferably when the (e.g. stop of the) valve member engages with the housing, the contact force between the (e.g. stop of the) valve member and the housing is substantially greater than the contact force between the valve member and the seal. It will be appreciated that the wear-compliant seal (i.e. owing to it being biased by the resilient member) allows this local force to be exerted on a, e.g. thin, rim while simultaneously allowing a large, e.g. metal on metal, axial load at the other end of the valve member.

Furthermore, when the end of the cylindrical housing takes the majority of the, e.g. axial, load from the closing force of the valve member (e.g. owing to a large pressure differential between the downstream pressure and the control pressure), such that the force of the valve member on the seal is relatively small, the sealing of the device (the barrier to the flow of fluid between the upstream and downstream sides of the device) is predominantly dictated by the geometry of the resilient member, whose biasing of the seal creates (and preferably guarantees) a sealing force.

Although the majority of the large closing force on the valve member (e.g. when there is a large pressure differential between the downstream pressure and the control pressure) is taken by the housing, once the valve member has closed all of the plurality of valve apertures the sealing force on the seal may then depend on the pressure differential between the upstream and downstream pressures. However, even when there is only a very small pressure differential (a very small pressure differential may be needed to balance the force of the resilient member on the seal), preferably the biasing force of the resilient member on the seal (and thus on the valve member) creates (and preferably guarantees) a sealing force.

The, e.g. circular rim of the, valve member may be shaped to come into contact with the seal in any suitable and desired way. In a preferred embodiment the, e.g. circular rim of the, valve member comprises a mating surface arranged to come into contact with a cooperating mating surface of the seal. Preferably the, e.g. circular rim of the, valve member comprises a chamfered edge. This reduced contact area between the, e.g. circular rim of the, valve member and the seal helps to improve the effectiveness of the sealing of the valve member because for a given sealing force (e.g. generated by the biasing of the seal by the resilient member) it increases the mechanically exerted pressure needed to achieve sealing, e.g. to achieve a minimum (mechanically exerted) pressure between the seal and the, e.g. circular rim of the, valve member in order to create an effective seal.

Thus, the sealing force generated by the biasing of the seal by the resilient member when the valve member is fully closed is converted into a high local, mechanically exerted pressure by the chamfered edge of the valve member, which helps to ensure that a seal is maintained. Preferably the mechanically exerted pressure of the (e.g. chamfered) rim on the seal is (e.g. always) greater than the (fluid) pressure differential between the upstream and downstream pressures.

It will also be appreciated that by providing a suitably designed (e.g. shaped), e.g. circular rim of the, valve member, the local force of the valve member on the seal may be controlled, e.g. owing to the surface area of the valve member that comes into contact with the seal and/or to the compression of the resilient member, and thus these may be chosen so to both optimise the performance of the valve member at shut-off and reduce the wear of the seal. Thus preferably the contact area between the, e.g. circular rim of the, valve member and the seal is tuned to ensure the barrier to the flow of fluid between the upstream and downstream sides of the device.

The seal, arranged at or beyond a position the valve member reaches when the one or more valve apertures are all closed, may comprise any suitable and desired type of seal. As will be appreciated, the seal provides a barrier to fluid passing between the upstream and downstream sides of the device, i.e. the seal is not sealing the one or more valve apertures through which the flow of fluid is being controlled. In a preferred embodiment the seal lies in a plane, e.g. parallel to the plane that the circular rim of the valve member lies in, e.g. perpendicular to the main cylindrical axis of the valve member (and the housing). Thus preferably the seal is circular, e.g. an annular seal. In a preferred embodiment the seal has (e.g. in its natural, uncompressed state) a quadrilateral (e.g. square) cross section, e.g. in a plane perpendicular to the tangent to the, e.g. circular, seal, e.g. a torus with a quadrilateral (e.g. square) cross section.

The seal may comprise any suitable and desired material, e.g. chosen to be durable to wear. In a preferred embodiment the seal comprises a plastic, e.g. polytetrafluoroethylene (PTFE). Preferably the seal is substantially non-deformable.

As has been discussed above, the biasing of the seal by the resilient member helps to allow the seal and the resilient member to provide an effective seal even when the seal has been worn by (e.g. repeated impacts of) the valve member. Preferably the seal is tolerant to up to 10% of the maximum dimension (e.g. the diameter of the cross-section) of the resilient member, e.g. approximately 0.5% of the internal diameter of the conduit, e.g. approximately 0.5 mm of wear, e.g. in the direction in which the valve member moves. It will be appreciated that for seals of this type, this is a comparatively large value.

The resilient member, that acts to bias the seal towards the valve member, may be provided in any suitable and desired way. Preferably the resilient member acts directly on (i.e. is in (direct) contact with) the seal. The biasing of the seal by the resilient member is preferably arranged to allow the seal to be moved (by a small amount, e.g. up to approximately 20% of the maximum dimension (e.g. the diameter of the cross-section) of the resilient member, e.g. approximately 1% of the internal diameter of the conduit, e.g. approximately 1 mm) by the valve member when it comes into contact with the seal.

The resilient member may act to bias the seal in any suitable and desired direction. Preferably the resilient member biases the seal in a direction towards the valve member, e.g. in an axial direction (i.e. parallel to the main cylindrical axis of the valve member (and the housing)). Preferably the resilient member is arranged behind the seal in the direction in which the valve member comes into contact with the seal.

In a preferred embodiment, e.g. when the seal lies in a plane, the resilient member lies in a plane, e.g. parallel to the plane that the circular rim of the valve member (and, e.g. that the seal) lies in, e.g. perpendicular to the main cylindrical axis of the valve member (and the housing). Thus preferably the resilient member is circular, e.g. an annular seal.

The resilient member could comprise an, e.g. annular, spring. However, in a preferred embodiment the resilient member comprises an O-ring, e.g. has (e.g. in its natural, uncompressed state) a circular cross section, e.g. in a plane perpendicular to the tangent to the, e.g. circular, resilient member, e.g. a torus with a circular cross section. Thus, preferably the elasticity of the O-ring provides the biasing of the resilient member, e.g. under compression (owing to the force between the valve member and the seal when they come into contact) the O-ring provides a biasing force against the force exerted by the valve member (through the seal).

The O-ring may comprise any suitable and desired material. Preferably the O-ring is made from an elastomeric, e.g. nitrile, material.

The seal and the resilient member may be provided, e.g. mounted, in the device in any suitable and desired way. In a preferred embodiment the seal and/or the resilient member are mounted on the housing, e.g. on the outside of the housing. Preferably the seal and/or the resilient member are mounted in a groove, e.g. integrally formed in the housing or formed by another component, e.g. a retaining ring, that is attached to the housing. Preferably the groove in which the seal and/or the resilient member are mounted extends circumferentially around the housing.

The seal and the resilient member may be mounted in the same groove. However preferably the device comprises a first groove in which the seal is mounted and a second groove, formed in the first groove, in which the resilient member is mounted, e.g. preferably the seal has a greater cross sectional area than the resilient member and thus preferably the second groove has a smaller cross sectional area than the first groove. Preferably the cross sectional area of the seal is approximately four times larger than the cross sectional area of the resilient member.

Preferably the groove(s) provide a stop for the seal and/or the resilient member against the action of the valve member when it comes into contact with the seal. Thus it will be appreciated that the valve member acting on the seal and thus in turn the resilient member results in the seal and the resilient member being compressed into their respective groove(s). Preferably, as a result of the valve member acting on the seal, the resilient member is compressed and deformed in its groove, e.g. substantially filling the groove, such that (e.g. along with the seal acting against the resilient member) the resilient member provides a barrier to the flow of fluid (i.e. through the groove in which the resilient member is located) between the upstream and downstream sides of the device.

In a preferred embodiment the groove in which the seal is mounted comprises an overhanging edge to retain the seal, e.g. formed in the radially outermost side of the groove. Thus to assemble the device, the seal may be push fitted into the groove. In another preferred embodiment the device comprises a retaining ring, e.g. made from stainless steel, arranged to retain the seal. Preferably the retaining ring is mounted with the seal in the groove (which may also comprise an overhanging edge to retain the retaining ring).

Preferably the seal and/or the resilient member are arranged, e.g. mounted in (e.g. a groove of the) device, such that they are, e.g. radially, floating (e.g. in the groove). This allows the seal and/or the resilient member to be pressure balanced before and after the barrier is formed by the seal between the upstream and downstream sides of the device. This pressure balance achieved via a clearance, e.g. in the radial direction, helps to reduce the wear on the seal and also means that the tolerance of the seal and/or the resilient member (e.g. with respect to the (e.g. groove of the) housing is not crucial.

When the valve member acts on the seal, which in turn acts on the resilient member, preferably the barrier created between the upstream and downstream sides of the device is a barrier to the flow of fluid in the radial direction, e.g. perpendicular to the reciprocal motion of the valve member. When the barrier is formed, preferably there is a static pressure either side of the seal and/or the resilient member.

Thus, when the groove comprises an overhanging edge or a retaining ring, preferably the valve member acts on the seal to push it away from the overhanging edge or the retaining ring to form the barrier (such that a static pressure either side of the barrier, e.g. pressure balanced with the respective upstream and downstream pressures, is able to be established). It will be appreciated that the wear tolerance of the seal (the wear of the seal such that the barrier is still formed) is preferably the distance through which the seal is moved by the valve member (e.g. when the seal is new), e.g. onto the stop at the end of the groove.

Figure 2:
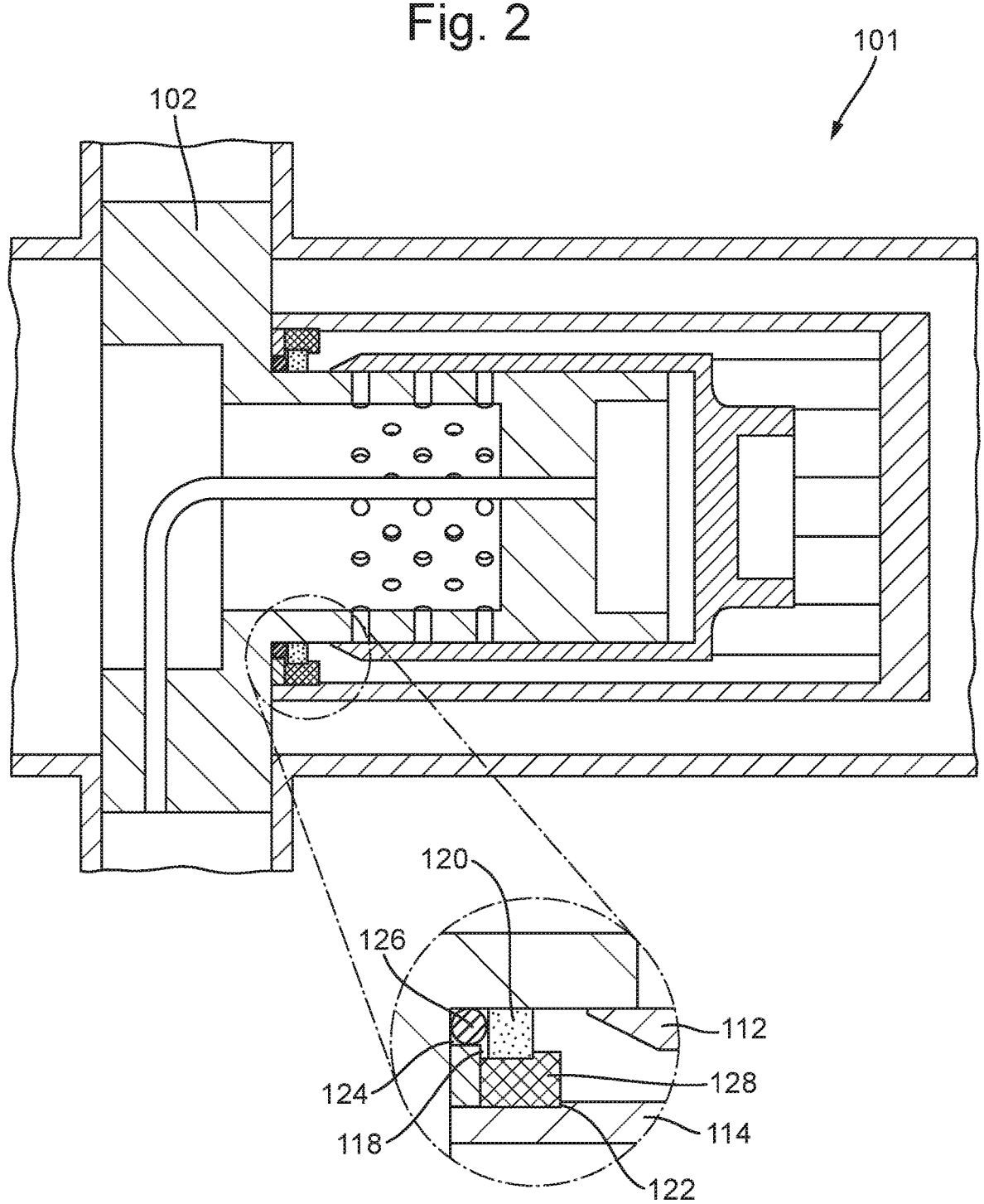

Certain preferred embodiments of the invention will now be described, by way of example only, with reference to the accompanying drawings in which:

FIG. 1 shows a cross-section view of a fluid flow control device in accordance with an embodiment of the present invention; and FIG. 2 shows a cross-section view of a fluid flow control device in accordance with another embodiment of the present invention.

There are many different industrial situations in which there is a desire to regulate the pressure in a fluid flow stream through a pipe or conduit. In such systems there is an input pressure that may be constant or fluctuating in time and which it is desired to control to a lower target output pressure, which also can be constant or fluctuating. As will now be described, embodiments of the present invention provide devices that are able to provide this control for the fluid flow.

FIG. 1 shows a cross-sectional view of a fluid flow control device 1 in accordance with an embodiment of the present invention. The device 1, e.g. a pressure regulator, includes a metal flange 2 for mounting the device 1 in a section of pipe 3, e.g. clamped between a joint in the pipework. The device also includes a metal housing 4 that has a cylindrical body in which a plurality of valve apertures 6, extending axially through the cylindrical housing 4, are formed. The housing 4 is attached to and extends perpendicularly to the flange 2, projecting into a downstream side 10 of the pipe 3.

The plurality of valve apertures 6 allow fluid to pass from an upstream side 8 of the pipe 3 to the downstream side 10 of the pipe 3. The flow of the fluid through the plurality of valve apertures 6 is controlled by a cylindrical metal valve member 12 that is mounted coaxially on the outside of the cylindrical housing 4, and arranged to move reciprocally in a direction parallel to the main cylindrical axis of the housing 4 and the valve member 12. The valve member 12 has a cap 13 at its end that is arranged to abut the end 15 of the housing 4 when the valve member 12 is fully closed, i.e. when it is covering all of the valve apertures 6. At the other end of the valve member 12, the circular rim has a chamfered end 11.

A plenum chamber 17, defined between the end 15 of the housing 4 and the cap 13 of the valve member 12, allows a control pressure to be introduced into the control volume of the plenum chamber 17 via a pipe 19, e.g. from a pilot pressure regulator (not shown).

The housing 4 is mounted on the flange 2, along with an outer casing 14 (in which a plurality of apertures 16 are formed), such that they define a first annular groove 18 in which an annular seal 20, having a square cross section and made from PTFE, is located. An overhanging lip 22 in the outer casing 14 is provided for the first groove 18 to retain the seal 20 in the first groove 18. These components can be seen more clearly in the magnified view shown in FIG. 1.

A second annular groove 24, smaller than the first annular groove 18, is defined in the first annular groove 18, and a resilient O-ring 26, having a circular cross section and made from nitrile rubber, is located in this second groove 24, held in place by the seal 20. As can be seen from the magnified view shown in FIG. 1, the O-ring 26 biases the seal 20 against the lip 22 of the first groove 18, though the O-ring 26 and the seal 20 are arranged (by their dimensions) such that they are radially floating (and thus pressure balanced) in their respective grooves 24, 18.

Operation of the fluid flow control device 1 in accordance with this embodiment of the invention will now be described with reference to FIG. 1.

With the fluid flow control device 1 installed in a pipe 3, i.e. mounted in the pipe 3 by its flange 2, and with a control pressure $P_2$ introduced into the plenum chamber 17 via the pipe 19 from a pilot pressure regulator (not shown), variations in the pressures ($P_1$ and $P_3$ respectively) in the pipe 3 on the upstream 8 and downstream 10 sides of the device 1 cause the valve member 12 to move reciprocally to open and close the plurality of valve apertures 6 in the housing 4, in order to control the flow of fluid through the device 1.

When the valve member 12 closes fully and thus shuts all the plurality of valve apertures 6 in the housing 4, the capped end 13 of the valve member 12 abuts against the end 15 of the housing 4, with a closing force that may reach several tens of kilonewtons, the majority of which is taken by the capped end 13 of the valve member 12 abutting against the end 15 of the housing 4. As the end 13 of the valve member 12 comes into contact with the end 15 of the housing 4, the other end 11 of the valve member 12 (i.e. the chamfered circular rim) comes into contact with the annular seal 20 that is held in the larger groove 18, though with a much reduced contact force.

The force of the end 11 of the valve member 12 on the seal 20 pushes the seal 20 against the O-ring 26 which is located in the smaller groove 24. As can be seen from the magnified section of FIG. 1, there is a small distance through which the seal 20 may be moved until it abuts against the bottom of the groove. The force of the end 11 of the valve member 12 through the seal 20 thereby compresses and deforms the O-ring 26 within the smaller groove 24, thus forming an effective barrier for fluid between the upstream 8 and downstream 10 sides of the pipe 3 and thus providing effective shut-off for the device. The barrier is enhanced by the chamfered end 11 of the valve member 12, which increases the local, mechanically exerted pressure between the chamfered end 11 and the seal 20 (compared to a flat end).

When the valve member 12 is closed, the biasing of the O-ring 26 on the seal, along with the pressure differential between the upstream pressure $P_1$ and the downstream pressure $P_3$ maintain the barrier between the upstream and downstream sides of the device 1.

Owing to the seal 20 being biased (sprung) by the resilient O-ring 26, this helps to reduce the force of the valve member 12 that is experienced by the seal 20. This thus helps to reduce the wear of the seal 20 by the valve member 12. Over repeated use of the device 1, and thus repeated impacts of the end 11 of the valve member 12 against the seal 20, the seal 20 will eventually wear (albeit at a slower rate). However, owing to the compliance provided to the seal 20 by the biasing of the O-ring 26, an effective barrier will still be provided, when the valve member 12 is closed, for fluid between the upstream 8 and downstream 10 sides of the device 1.

FIG. 2 shows a cross-sectional view of a fluid flow control device 101 in accordance with another embodiment of the present invention. The device 101 is very similar to the embodiment shown in FIG. 1, except for the details shown in the magnified section.

As in the embodiment shown in FIG. 1, a housing 104 is mounted on a flange 102, along with an outer casing 114, such that they define a first annular groove 118 in which an annular seal 120, having a rectangular cross section and made from PTFE, is located. The seal 120 is retained in the first groove 118 by a stainless steel retaining ring 128, which itself is retained in the first groove by an overhanging lip 122 in the outer casing 114.

A second annular groove 124, smaller than the first annular groove 118, is defined in the first annular groove 118, and a resilient O-ring 126, having a circular cross section and made from nitrile rubber, is located in this second groove 124, held in place by the seal 120. As can be seen from the magnified view shown in FIG. 2, the O-ring 126 biases the seal 120 against the lip 122 of the first groove 118 via the retaining ring 128.

Operation of the fluid flow control device 101 in accordance with the embodiment shown in FIG. 2 is the same as described above for the embodiment shown in FIG. 1.

It can be seen from the above that in at least preferred embodiments, the fluid control flow device of the present invention provides a device for controlling the flow in a conduit in which a biased seal helps to provide an effective barrier at shut-off of the valve to the flow of fluid between the upstream and downstream sides of the device. The biased seal is particularly wear resistant, owing to its compliance, and maintains an effective seal even when it is at least partially worn.

The invention claimed is:

1. A device for controlling a flow of a fluid through a conduit from an upstream side of the device to a downstream side of the device, the device comprising:
   a housing having defined therein one or more valve apertures through which the flow of fluid is selectively controlled;
   a valve member mounted on the housing and arranged to move reciprocally to selectively open and close the one or more valve apertures, thereby controlling flow of the fluid through the one or more valve apertures;
   a moveably mounted seal arranged at or beyond a position the valve member reaches when the one or more valve apertures are all closed; and
   a resilient member that acts to bias the seal towards the valve member,
   wherein the resilient member comprises an O-ring; and
   wherein the valve member is arranged to come into contact with the seal when the valve member reaches or passes the position at which the one or more valve apertures are all closed such that the valve member acts on the seal against the bias of the resilient member, and the seal acts to provides a barrier to the flow of fluid between the upstream and downstream sides of the device.

2. The device as claimed in claim 1, wherein the housing comprises a cylinder, and the valve member comprises a cylinder mounted coaxially on an outside of the housing and arranged to move reciprocally in a direction in which the housing and the valve member are cylindrically extended.

3. The device as claimed in claim 2, wherein the valve member comprises a circular rim arranged to come into contact with the seal when the valve member reaches or passes the position at which the one or more valve apertures are all closed.

4. The device as claimed in claim 3, wherein the circular rim of the valve member comprises a mating surface arranged to come into contact with a cooperating mating surface of the seal.

5. The device as claimed in claim 3, wherein the circular rim of the valve member comprises a chamfered edge.

6. The device as claimed in claim 5, wherein a mechanically exerted pressure of the chamfered edge on the seal is greater than a fluid pressure differential between the upstream and downstream sides of the device.

7. The device as claimed in claim 1, wherein the valve member comprises a stop arranged to engage with the housing to limit travel of the valve member past a point at which the valve member comes into contact with the seal.

8. The device as claimed in claim 7, wherein when the stop of the valve member engages with the housing, a contact force between the stop of the valve member and the housing is greater than a contact force between the valve member and the seal.

9. The device as claimed in claim 1, wherein the seal comprises an annular seal with a quadrilateral cross section.

10. The device as claimed in claim 1, wherein the seal comprises a plastic material.

11. The device as claimed in claim 1, wherein the seal and/or the resilient member are mounted on an outside of the housing.

12. The device as claimed in claim 1, wherein the seal and/or the resilient member are mounted in a groove that extends circumferentially around the housing.

13. The device as claimed in claim 12, where the seal and/or the resilient member are mounted in the groove so as to radially float in the groove.

14. A device for controlling flow of a fluid through a conduit from an upstream side of the device to a downstream side of the device, the device comprising:
   a housing having defined therein one or more valve apertures through which the flow of fluid is selectively controlled;
   a valve member mounted on the housing and arranged to move reciprocally to selectively open and close the one or more valve apertures, thereby controlling flow of the fluid through the one or more valve apertures;
   a moveably mounted seal arranged at or beyond a position the valve member reaches when the one or more valve apertures are all closed; and
   a resilient member that acts to bias the seal towards the valve member;
   wherein the valve member is arranged to come into contact with the seal when the valve member reaches or passes the position at which the one or more valve apertures are all closed, such that the valve member acts on the seal against the bias of the resilient member and the seal acts to provides a barrier to the flow of fluid between the upstream and downstream sides of the device; and wherein the valve member comprises a stop arranged to engage with the housing to limit travel of the valve member past a point at which the valve member comes into contact with the seal.

15. A device for controlling a flow of a fluid through a conduit from an upstream side of the device to a downstream side of the device, the device comprising:

a housing having defined therein one or more valve apertures through which the flow of fluid is selectively controlled;

a valve member mounted on the housing and arranged to move reciprocally to selectively open and close the one or more valve apertures, thereby controlling flow of the fluid through the one or more valve apertures;

a moveably mounted seal arranged at or beyond a position the valve member reaches when the one or more valve apertures are all closed; and a resilient member that acts to bias the seal towards the valve member;

wherein the valve member is arranged to come into contact with the seal when the valve member reaches or passes the position at which the one or more valve apertures are all closed such that the valve member acts on the seal against the bias of the resilient member and the seal acts to provides a barrier to the flow of fluid between the upstream and downstream sides of the device; and wherein one or more of the valve member, the moveably mounted seal, and the resilient member are mounted on an outside of the housing.

\* \* \* \* \*